Patented Jan. 8, 1929.

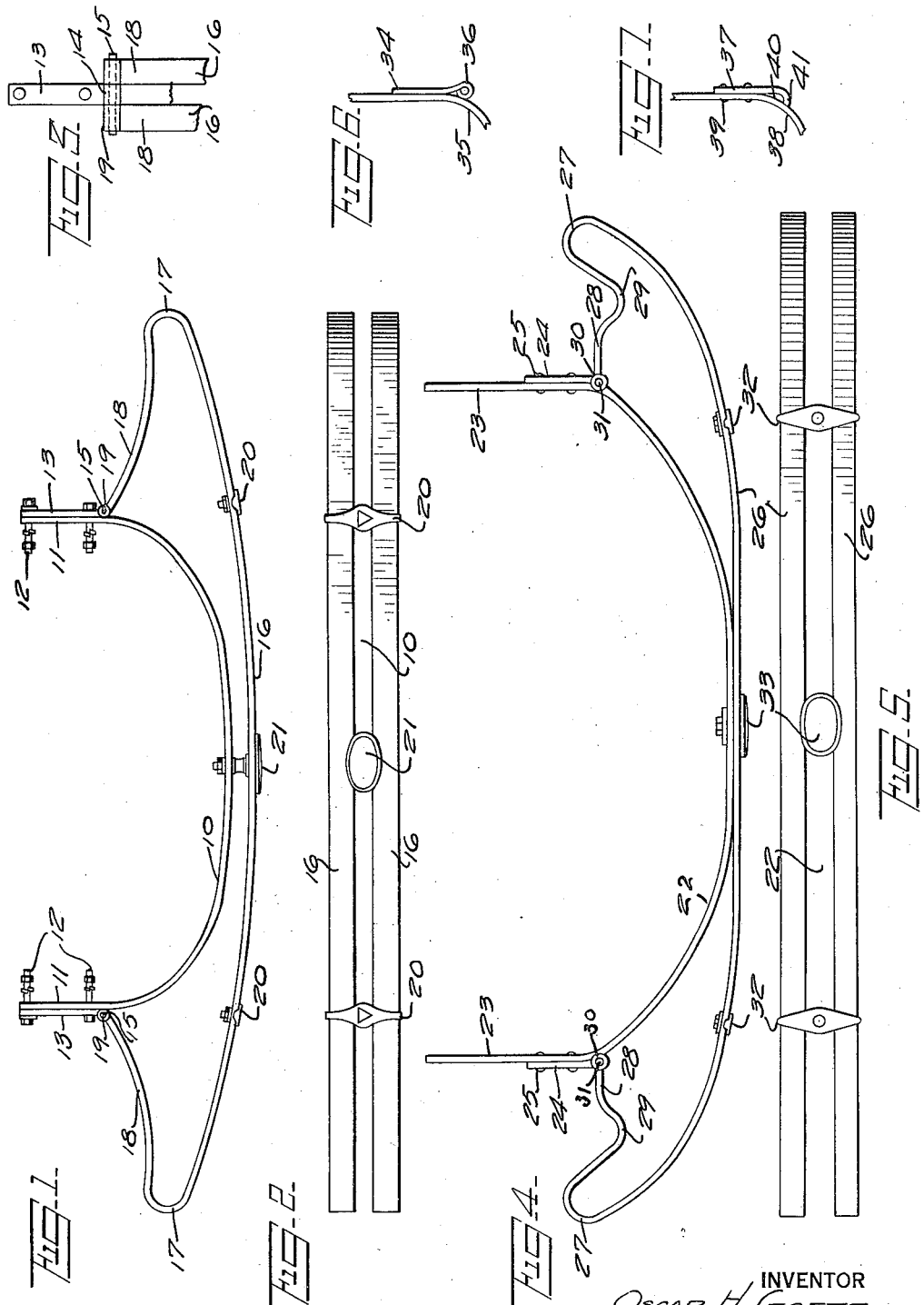

1,697,975

UNITED STATES PATENT OFFICE.

OSCAR H. GOETZ, OF CHICAGO, ILLINOIS, ASSIGNOR TO AMERICAN CHAIN COMPANY, INC., A CORPORATION OF NEW YORK.

BUMPER.

Application filed October 20, 1926. Serial No. 142,800.

My improvement relates to bumpers for vehicles and particularly to loop-end bumpers or bumpers having impact members that are bent back at each end to form loops.

One object of my invention is to provide an improved form of bumper adapted particularly to withstand impacts at or near the ends thereof.

Another object of my invention is to increase the flexibility of the end portions of a loop-end bumper.

Another object is to attach the ends of an impact member to relatively fixed parts of the bumper by means of hinges, thereby providing great flexibility and reducing the danger of breakage at such points of attachment.

With these and other objects in view my invention consists in certain novel features of construction and combinations and arrangements of parts, which will be more fully hereinafter described and pointed out in the claims.

In the accompanying drawings,

Figure 1 is a plan view of my improved bumper;

Figure 2 is a front view of the same;

Figure 3 is a side view of a portion of the bumper slightly enlarged, and showing a hinge connection employed in the bumper;

Figs. 4 and 5 are plan and front views respectively, of a modified form of bumper; and Figs. 6 and 7 are plan views respectively, showing two forms of brackets that may be used on my improved bumper.

My improved bumper comprises a rear bar 10, of spring metal, bent to the form of an arch with approximately parallel end portions 11 extending rearwardly and adapted to engage the longitudinal frame members of a vehicle. Said arch ends are apertured to receive bolts 12 by which the arched rear bar 10 may be secured to the vehicle frame members. Bearing against the outer face of each arch end 11, is a bracket 13 which is also apertured to receive the bolts 12. The bracket 13 consists of a short bar preferably of the same width as the bar 10, which is formed at the forward end with an eye or bearing 14 for a pintle 15.

In front of the arched bar 10, I provide an impact member which consists of a pair of spring bars 16 that are slightly bowed and that are reversely bent near each end to form loops 17. The reversely turned end portions 18 of the bars 16 are slightly bowed forward and extend with a slight rearward trend to the forward ends of the respective brackets 13. The end portions or arms 18 are bent at their free ends to form eyes 19 adapted to engage the pintles 15. The bars 16 are spaced apart and engage the pintles 15 on opposite sides of the eyes 14, as shown in Fig. 3. In this spaced relation the bars 16 are held by means of spacers or cross members 20 and a center clamp 21, the latter serving to clamp the impact bars 16 to the arched rear bar 10. Thus the impact members are rigidly connected to the arched rear bar at the center thereof and pivotally connected thereto at their ends. The brackets 13 are virtually part of the arched rear bar 10 because they are rigidly clamped thereto by the bolts 12 when the bumper is fastened to the vehicle. By reason of the hinge connections the arms 18 may make a sharp angle with the arch ends 11 without unduly stiffening the looped ends of the impact member. The points of attachment of arms 18 to the arch ends 11, respectively, are subjected to severe strain when the looped ends of the bumper are struck, and, were the arms 18 made integral with the brackets, not only would the structure be too stiff, but there would be likelihood of breakage at the sharp bend where the member 18 met the member 13. By my improved construction weakness of the bumper at the point of attachment of the bumper ends to the arched rear bar is avoided.

When a looped end of the bumper is subjected to an impact the loop 17 cannot describe a true arc about the adjacent pintle as a center, because it is connected to the arched rear bar by the clamp 21. Hence, member 18 bows forward as the loop 17 swings rearward and the arch 10 is distorted by the lateral pull on the clamp 21. The member 18 thus serves as a strut to take the thrust of the impact, and it will be observed that this thrust is directed toward the adjacent arch end 11, so the latter serves as a brace to reinforce the adjacent eye 14 and prevent the pintle 15 from tearing out of the bracket 13.

In Figs. 4 and 5, I have shown another form of bumper for vehicles. The bumper is also of the loop-end type, but differs from the type shown in Figs. 1 and 2, mainly in the fact that the loops 27 extend slightly to the rear of the points of attachment of the impact member to the arched rear bar. As shown in the drawings, the arched rear bar 22 is provided with arch ends 23, which are considerably longer than those shown in Fig. 1, so as to permit of attaching the bumper to a vehicle whose frame members do not extend as far forward as those of vehicles adapted to receive the bumper shown in Fig. 1.

Bearing against the outer faces of the arch ends 23 are two brackets 24 which are respectively secured thereto by means of rivets 25. In front of the arched rear bar 22, I provide an impact member comprising a pair of spaced bars 26, which are reversely bent at each end thereof, to form loops 27. The reversely turned end portions 28 are disposed approximately at right angles to the brackets 24, but are formed with a forward bend 29, adjacent the loop 27. The free ends of the terminal portions 28 are formed with eyes 30, to engage pintles 31 carried by the brackets 24. The impact bars 26 are held in relatively spaced relation by means of cross members 32, and are secured to the arched rear bar 22, midway of their length, by means of a central clamp 33.

In service the action of this bumper is slightly different from that shown in Figs. 1 and 2, for the reason that the loops 27 extend somewhat to the rear of the pintles 31, and also by reason of the fact that the members 28, connecting the loop 27 to the bracket 24, lie normally at right angles to the bracket 24. When the bumper is subjected to an impact against one of the loops 27, the bars 26 will flex comparatively freely until they strike the bend 29 and thereafter the part 28 will act as a strut to stiffen the bumper against further movement.

The brackets secured to the arch ends of my bumper may be of various forms. In Fig. 6, for instance, I show a bracket 34 which is welded to an arched rear bar 35. At its forward end the bracket 34 is turned inward to form an eye 36 which bears against the member 35. In this eye may be secured a pintle upon which the impact members of the bumper may be pivoted.

In the structure shown in Fig. 7, a bracket 37 is secured to an arched rear bar 38 by means of rivets 39. The bracket 37 continues forward past the point where the curvature of the arched member 38 begins, thereby forming a wedged shaped space 40 in which a pintle may be secured. The extreme forward end 41 of the bracket 37 is curved inwardly toward the member 38 so as to close the outer end of the space 40. This provides a more economical construction of bracket than that shown in Fig. 6, and in view of the fact that the main thrust on the hinge is in a direction toward the arched rear bar, there will be no tendency for the pintle to escape from the space 40.

Having thus described my invention and with the understanding that further variations, changes and modifications may be made without departing from the spirit and scope of my invention, I claim:

1. A bumper for vehicles comprising an arched rear bar, brackets respectively secured to the ends of the arched bar, and an impact member hinged at opposite ends thereof to said brackets.

2. A bumper for vehicles comprising an arched rear bar, brackets mounted respectively on the ends of the arched bar, an impact member reversely bent near each end thereof, and a hinge at each end of the impact member connecting the impact member to said brackets.

3. A bumper for vehicles comprising an arched rear bar, brackets respectively secured to the ends of the arched bar, an impact member hinged at opposite ends thereof to said brackets and a central clamp connecting the impact member to the arched bar.

4. A bumper for vehicles comprising an arched rear bar, an impact member in front of said bar, the latter being reversely bent near each end to form loops, and hinges connecting the ends of the impact member to the arched rear bar near the ends thereof.

5. A bumper for vehicles comprising an arched rear bar, an impact member in front of said bar, the latter being reversely bent near each end to form loops, hinges connecting the impact member to the arched rear bar at the ends thereof, and a central clamp connecting the impact members to the arched rear bar intermediate the ends thereof.

6. A bumper for vehicles comprising an arched rear bar, an impact member in front of said bar, the latter being reversely bent near each end to form loops, and hinges connecting the ends of the impact member to the arched rear bar near the ends thereof, said loops extending to the rear of a line passing through said hinges.

7. A bumper for vehicles comprising an arched rear bar, an impact member in front of said bar, the latter being reversely bent near each end to form loops, hinges connecting the impact member to the arched rear bar at the ends thereof and a central clamp connecting the impact members to the arched rear bar intermediate the ends thereof, said loops extending to the rear of a line passing through said hinges.

8. A bumper for vehicles comprising an arched rear bar, an impact member in front of said bar, said impact member having reversely bent end portions forming loops, and hinges connecting the free end of said end portions to said arched rear bar, said end portions being formed with forwardly projecting bends.

9. A bumper for vehicles comprising an arched rear bar, an impact member in front of said bar, said impact member having reversely bent end portions forming loops, and hinges connecting the free ends of said end portions to said arched rear bar, said loops extending to the rear of a line passing through said hinges, said end portions being formed with forwardly projecting bends.

10. A bumper for vehicles comprising an arched rear bar, an impact member in front of said bar, said impact member having reversely bent end portions forming loops, hinges connecting the free ends of said end portions to said arched rear bar, said end portions being formed with forwardly projecting bends, and a central clamp connecting said impact member to said arched rear bar.

11. A bumper for vehicles comprising an arched rear bar, an impact member in front of said bar, said impact member having reversely bent end portions forming loops, and hinges connecting the free ends of said end portions to said arched rear bar, said loops extending to the rear of a line passing through said hinges, said end portions being formed with forwardly projecting bends, and a central clamp connecting said impact member to said arched rear bar.

12. A bumper for vehicles comprising an arched rear bar, brackets mounted respectively on the ends of said arched rear bar, and an impact member pivotally connected at opposite ends thereof to said brackets, each bracket comprising a bar formed with an eye for a pintle, the eye being formed by bending the bracket bar inwardly toward the adjacent face of said arched rear bar.

13. A bumper for vehicles comprising an arched rear bar, brackets mounted respectively on the ends of said arched rear bar, and an impact member pivotally connected at opposite ends thereof to said brackets, each bracket comprising a bar curved at its forward end to meet the adjacent face of said arched rear bar, thereby forming an eye to receive a pintle.

In witness whereof, I have signed this specification.

OSCAR H. GOETZ.